(12) United States Patent
Shinde et al.

(10) Patent No.: US 12,079,735 B2
(45) Date of Patent: Sep. 3, 2024

(54) CONTROL LOGIC FOR THRUST LINK WHIFFLE-TREE HINGE POSITIONING FOR IMPROVED CLEARANCES

(71) Applicant: General Electric Company

(72) Inventors: Kudum Shinde, Bangalore (IN); Mahesh Khandeparker, Bangalore (IN)

(73) Assignee: General Electric Company, Cincinnati, OH (US)

( * ) Notice: Subject to any disclaimer, the term of this patent is extended or adjusted under 35 U.S.C. 154(b) by 335 days.

(21) Appl. No.: 17/323,667

(22) Filed: May 18, 2021

(65) Prior Publication Data
US 2022/0371738 A1 Nov. 24, 2022

(51) Int. Cl.
*F01D 11/14* (2006.01)
*F01D 5/12* (2006.01)
*F01D 11/22* (2006.01)
*F01D 11/24* (2006.01)
*F02C 7/20* (2006.01)
(Continued)

(52) U.S. Cl.
CPC ............. *G06N 5/00* (2013.01); *F01D 5/12* (2013.01); *F01D 11/14* (2013.01); *F01D 11/22* (2013.01); *F01D 11/24* (2013.01); *F02C 7/20* (2013.01); *G06N 20/00* (2019.01); *F05D 2270/54* (2013.01); *F05D 2270/70* (2013.01); *F05D 2270/709* (2013.01)

(58) Field of Classification Search
CPC .......... F01D 11/14; F01D 11/20; F01D 11/22; F02C 7/20; F05D 2270/30; F05D 2270/305; F05D 2270/336; F05D 2270/50; F05D 2270/709; F05D 2270/71; F05D 2260/81; B64D 2027/26; B64D 2027/262; B64D 2027/268
See application file for complete search history.

(56) References Cited

U.S. PATENT DOCUMENTS 5,319,922 A * 6/1994 Brantley .................. F01D 25/24
244/54
5,746,391 A * 5/1998 Rodgers ................. B64D 27/18
248/556

(Continued)

FOREIGN PATENT DOCUMENTS

DE 102010025488 B4 10/2012

*Primary Examiner* — Todd E Manahan
*Assistant Examiner* — Sean V Meiller
(74) *Attorney, Agent, or Firm* — Hanley, Flight & Zimmerman, LLC

(57) ABSTRACT

Systems and methods for optimizing clearances within an engine include an adjustable coupling configured to couple a thrust link to the aircraft engine, an actuator coupled to the adjustable coupling, where motion produced by the actuator adjusts a hinge point of the adjustable coupling, sensors configured to capture real time flight data, and an electronic control unit. The electronic control unit receives flight data from the sensors, implements a machine learning model trained to predict clearance values within the engine based on the received flight data, predicts, with the machine learning model, the clearance values within the engine based on the received flight data, determines an actuator position based on the clearance values, and causes the actuator to adjust to the determined actuator position.

19 Claims, 7 Drawing Sheets

(51) Int. Cl.
　　　*G06N 5/00*　　　(2023.01)
　　　*G06N 20/00*　　　(2019.01)

(56) References Cited

U.S. PATENT DOCUMENTS

| | | |
|---|---|---|
| 7,566,029 B2 | 7/2009 | Dron et al. |
| 8,251,311 B2 | 8/2012 | Combes et al. |
| 8,322,652 B1 | 12/2012 | Stretton |
| 9,394,057 B2 | 7/2016 | Guillou |
| 9,593,989 B2 | 3/2017 | Hegenbart et al. |
| 9,783,312 B2 | 10/2017 | Kumar et al. |
| 10,414,507 B2 * | 9/2019 | Schelfaut ................ F01D 11/24 |
| 10,814,993 B2 * | 10/2020 | Sawyers-Abbott ....... F02C 7/20 |
| 2018/0258785 A1 | 9/2018 | Schelfaut |
| 2018/0281980 A1 | 10/2018 | Riviere et al. |

* cited by examiner

CONTROL LOGIC FOR THRUST LINK WHIFFLE-TREE HINGE POSITIONING FOR IMPROVED CLEARANCES

TECHNICAL FIELD

The present disclosure relates to systems and methods for controlling a pivot position of an adjustable coupling to optimize clearances within an aircraft engine.

BACKGROUND

Optimization of turbine blade tip clearances leads to better engine performance and fuel efficiency. That is, during different stages of thrust, the engine is exposed to loads such as heat and centrifugal forces that cause expansion of certain components and shifts in the alignment of components such as the position of shaft within the high pressure compressor. For example, the shaft in the high pressure compressor can laterally shift, causing changes in alignment between the centerlines of the rotor blades and stator flow paths.

To adjust the clearance between the tips of the rotating turbine blades (e.g., rotor blades of the high pressure compressor) and a turbine casing such as a shroud, which affects the stator flow paths, an Active Clearance Control (ACC) system may provide thermal control air which impinges on the turbine casing with the intent of adjusting the position of the casing and shrouds relative to the rotor blade tips. More particularly, an engine controller (e.g., an Electronic Engine Controller (EEC) or Electronic Control Unit (ECU) equipped with Full Authority Digital Engine Control (FADEC)) may utilize a clearance algorithm to calculate instantaneous turbine blade tip clearances. The calculated clearances may then be compared to a blade tip clearance target. If the calculated clearances do not align with the clearance target, the ACC system may adjust the blade tip clearances to force the calculated clearances to agree with the clearance target. In this way, the shrouds are adjusted relative to the blade tips.

Despite the ability of ACC systems to control blade tip clearances, clearance targets are typically set without regard to how an engine is actually or uniquely operated. Rather, each engine of a particular engine model targets the same blade tip clearances regardless of how the engine is operated. Additionally, engine designs must account for cold build clearances to avoid rubs which results in open clearances when the engine is running.

Therefore, improved active clearance control logic for adjusting blade tip clearances can deliver greater efficiency improvements and fuel usage.

SUMMARY

In an embodiment, a system for optimizing clearances within an aircraft engine includes an adjustable coupling configured to couple a thrust link to the aircraft engine, an actuator coupled to the adjustable coupling, where motion produced by the actuator adjusts a hinge point of the adjustable coupling, one or more sensors configured to capture real time flight data, and an electronic control unit communicatively coupled to the actuator and the one or more sensors. The electronic control unit is configured to receive flight data from the one or more sensors, implement a machine learning model trained to predict one or more clearance values within the aircraft engine based on the received flight data, predict, with the machine learning model, the one or more clearance values within the aircraft engine based on the received flight data, determine an actuator position based on the one or more clearance values, and cause the actuator to adjust to the determined actuator position.

In an embodiment, a method for optimizing clearances within an aircraft engine includes receiving, with an electronic control unit, flight data from one or more sensors, implementing, with the electronic control unit, a machine learning model trained to predict one or more clearance values within the aircraft engine based on the flight data, predicting, with the machine learning model, the one or more clearance values within the aircraft engine based on the flight data, determining, with the electronic control unit, an actuator position based on the one or more clearance values, and causing, with the electronic control unit, an actuator to adjust to the determined actuator position.

In an embodiment, an aircraft includes an aircraft engine coupled to a wing with at least one thrust link and an adjustable coupling, where the adjustable coupling comprising at least one aperture for coupling to the at least one thrust link and a slot defining a hinge point of the adjustable coupling, an actuator comprising a pivot pin slidably coupled within the slot, where motion produced by the actuator adjusts a position of the pivot pin within the slot thereby changing the hinge point of the adjustable coupling, one or more sensors configured to capture real time flight data, and an electronic control unit communicatively coupled to the actuator and the one or more sensors. The electronic control unit is configured to receive flight data from the one or more sensors, implement a machine learning model trained to predict one or more clearance values within the aircraft engine based on the received flight data, predict, with the machine learning model, the one or more clearance values within the aircraft engine based on the received flight data, determine an actuator position based on the one or more clearance values, and cause the actuator to adjust to the determined actuator position.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
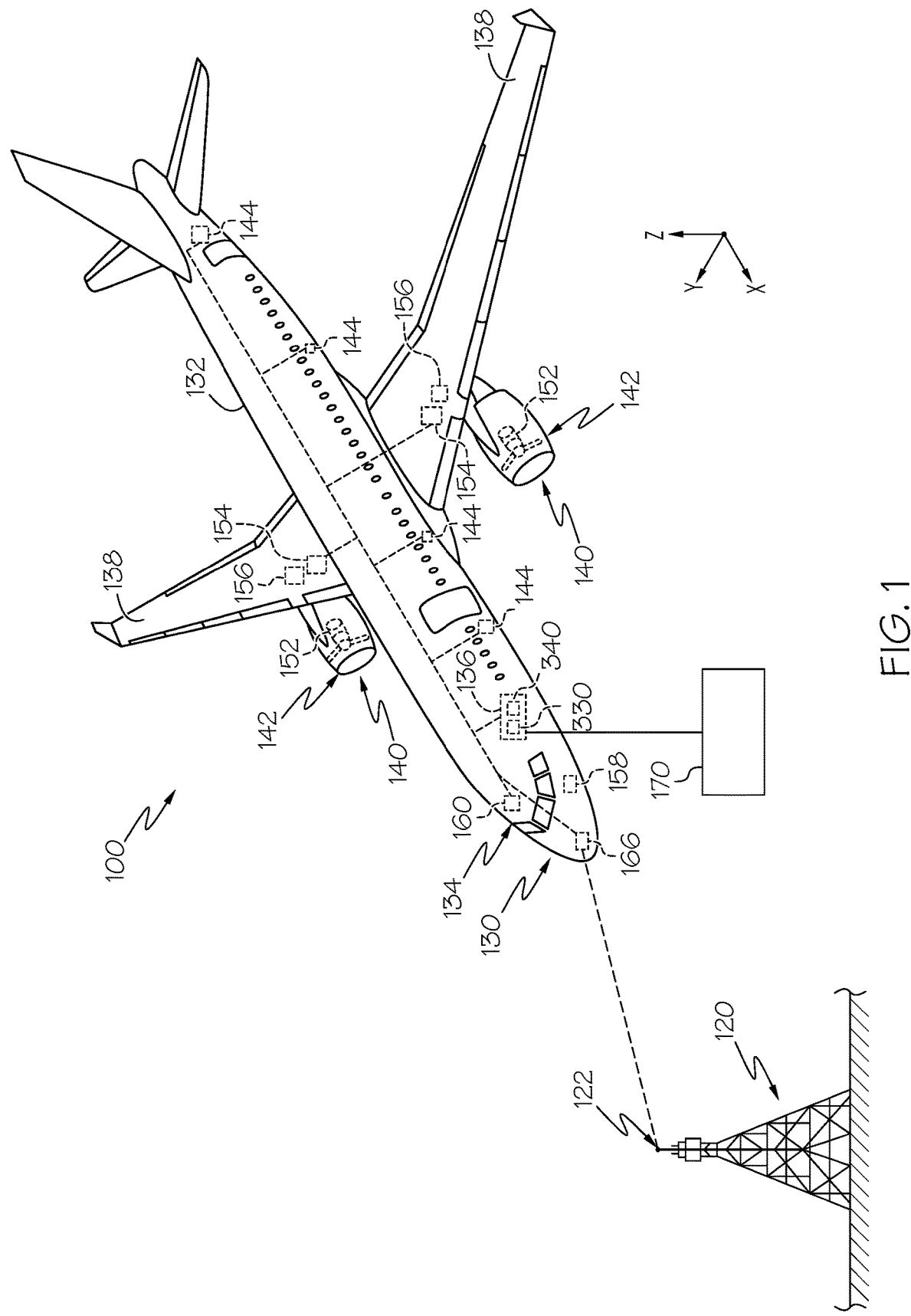
FIG. 1 schematically depicts an example aircraft system according to one or more embodiments shown and described herein.

Embodiments of the present disclosure include systems and methods for optimizing clearances within an aircraft engine to improve specific fuel consumption (SFC) and improving operating efficiency of the engine. More specifically, the systems and methods disclosed herein relate to optimizing clearances by controlling a hinge point of a thrust link hinge, which is referred to herein as an adjustable coupling such as a whiffletree. The present disclosure further provides control logic for adjusting a hinge position of a whiffletree, as described in more detail herein. The hinge position of the whiffletree provides better control with respect to centering of a rotor to stator in the horizontal direction by reducing cold clearances. That is, tighter cold clearances will reflect tighter cruise clearances thereby reducing SFC and improving efficiency. For example, in some embodiments described herein, clearances in the high pressure compressor may be improved ~3-5 mills delivering, for example, 0.05 to 0.1% SFC improvement.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", "third" and so on may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. "Radially inward" is toward the longitudinal axis and "radially outward" is away from the longitudinal axis.

Exemplary aspects of the present disclosure are directed to systems and methods for adjusting blade tip clearance targets by controlling the hinge position of a whiffletree link. In one embodiment, a whiffletree includes at least one aperture for coupling to one or more thrust links that may be further coupled to an airplane wing and/or fuselage. The whiffletree also includes a slot defining a hinge point. An actuator comprising a pivot pin is slidably coupled within the slot of the whiffletree. Motion produced by the actuator adjusts the position of the pivot pin within the slot of the whiffletree thereby changing the hinge point of the whiffletree. One or more sensors configured to capture real time flight data generate and send signals to an electronic control unit communicatively coupled to the actuator. The electronic control unit is configured to receive flight data from the one or more sensors, implement a machine learning model trained to predict one or more clearance values within the aircraft engine based on the received flight data, predict, with the machine learning model, the one or more clearance values within the aircraft engine based on the received flight data, determine an actuator position based on the one or more clearance values; and cause the actuator to adjust to the determined actuator position.

Referring now to the figures, embodiments of the present disclosure related to aircraft, systems, and methods for optimizing clearances with an aircraft engine will be depicted and described in detail.

FIG. 1 depicts an illustrative aircraft system 100. In the illustrated embodiment of FIG. 1, the aircraft system 100 generally includes an aircraft 130, which may include a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations and/or aerial vehicles may include high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure. Furthermore, other configurations may include more than two wing assemblies 138, more than two engines 140 (e.g., trijets, quadjets, etc.), engines 140 that are not mounted to a wing assembly 138 (e.g., mounted to the fuselage 132, mounted to the tail, mounted to the nose, etc.), non-fixed wings (e.g., rotary wing aircraft), and/or the like.

Turning back to the illustrated aircraft system depicted in FIG. 1, as shown, a control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine control system 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine control system 136 may be communicatively coupled to the plurality of aircraft systems 144 and the engines 140. In some embodiments, the engine control system 136 may be mounted on one or more of the engines 140 or mounted within the aircraft 130 and communicatively coupled to the engines 140. While the embodiment depicted in FIG. 1 specifically refers to the engine control system 136, it should be understood that other controllers may also be included within the aircraft 130 to control various other aircraft systems 144 that do not specifically relate to the engines 140.

The engine control system 136 generally includes one or more components for controlling each of the engines 140, such as, for example, a diagnostic computer, an engine-related digital electronic unit that is mounted on one or more of the engines 140 or the aircraft 130, and/or the like. The engine control system 136 may also be referred to as a digital engine control system. Illustrative other components within the engine control system that may function with the engine control system 136 and may require software to operate include, but are not limited to, an electronic control unit (ECU) and other controller devices. The software implemented in any one of these components may be software that is distributed between components and controllers.

The engine control system 136 may also be connected with other controllers of the aircraft 130. In embodiments, the engine control system 136 may include a processor 330 and/or a non-transitory memory component 340, including non-transitory memory. In some embodiments, the non-transitory memory component 340 may include random access memory (RAM), read-only memory (ROM), flash memory, or one or more different types of portable electronic memory, such as discs, DVDs, CD-ROMs, or the like, or any suitable combination of these types of memory. The processor 330 may carry out one or more programming instructions stored on the non-transitory memory component 340, thereby causing operation of the engine control system 136. That is, the processor 330 and the non-transitory memory component 340 within the engine control system 136 may be operable to carry out the various processes described herein with respect to the engine control system 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof, installing software, installing software updates, modifying a record in a distributed ledger to indicate that software has been installed, and/or updated, carrying out processes according to installed and/or updated software, and/or the like.

In some embodiments, the engine control system 136 may be a full authority digital engine control (FADEC) system. Such a FADEC system can include various electronic components, one or more sensors, and/or one or more actuators that control each of the engines 140. In some embodiments, the FADEC system includes an electronic control unit (ECU), as well as one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software, such as the software that is distributed by the aircraft system 100 described herein. As such, the FADEC can be programmatically controlled to determine engine limitations, receive engine health reports, receive engine maintenance reports, and/or the like to undertake certain measures and/or actions in certain conditions.

The software run by the engine control system 136 (e.g., executed by the processor 330 and stored within the non-transitory memory component 340) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine control system 136 and installed for use by the engine control system 136. For example, the computer program product may be provided by the ground support equipment 170, as described in greater detail herein. The computer program product may generally be updatable via a software update that is received from one or more components of the aircraft system 100, such as, for example, the ground support equipment 170, as described in greater detail herein. The software is generally updated by the engine control system 136 by installing the update such that the update supplements and/or overwrites one or more portions of the existing program code for the computer program product. The software update may allow the computer program product to more accurately diagnose and/or predict faults, provide additional functionality not originally offered, and/or the like.

In embodiments, each of the engines 140 may include a fan 142 and one or more sensors for sensing various characteristics of the fan 142 during operation of the engines 140. Illustrative examples of the one or more sensors include, but are not limited to, a fan speed sensor 152, a temperature sensor 154, a pressure sensor 156, a cross wind sensor 158, and/or other aircraft or flight sensors. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like. The cross wind sensor 158 may be one or more sensors that measure and/or contribute to the calculation of a cross wind as the plane traverses a flight path.

In some embodiments, each of the engines 140 may have a plurality of sensors associated therewith (including one or more fan speed sensors 152, one or more temperature sensors 154, one or more pressure sensors 156, and/or one or more cross wind sensors 158). That is, more than one of the same type of sensor may be used to sense characteristics of an engine 140 (e.g., a sensor for each of the different areas of the same engine 140). In some embodiments, one or more of the sensors may be utilized to sense characteristics of more than one of the engines 140 (e.g., a single sensor may be used to sense characteristics of two engines 140). The engines 140 may further include additional components not specifically described herein, and may include one or more additional sensors incorporated with or configured to sense such additional components in some embodiments.

In embodiments, each of the sensors (including, but not limited to, the fan speed sensors 152, the temperature sensors 154, the pressure sensors 156, the cross wind sensors 158, and/or other sensors) may be communicatively coupled to one or more components of the aircraft 130 such that signals and/or data pertaining to one or more sensed characteristics are transmitted from the sensors for the purposes of determining, detecting, and/or predicting a fault, as well as completing one or more other actions in accordance with software that requires sensor information. As indicated by the dashed lines extending between the various sensors (e.g., the fan speed sensors 152, the temperature sensors 154, the pressure sensors 156, the cross wind sensors 158, and/or other sensors) and the aircraft systems 144 and the engine control system 136 in the embodiment depicted in FIG. 1, the various sensors may be communicatively coupled to the aircraft systems 144 and/or the engine control system 136 in some embodiments. As such, the various sensors may be communicatively coupled via wires or wirelessly to the aircraft systems 144 and/or the engine control system 136 to transmit signals and/or data to the aircraft systems 144 and/or the engine control system 136 via an aircraft bus.

An aircraft bus may enable an aircraft and/or one or more components of the aircraft to interface with one or more external system through wireless or wired means. An aircraft bus as used herein may be formed from any medium that is configured to transmit a signal. As non-limiting examples, the aircraft bus is formed of conductive wires, conductive traces, optical waveguides, or the like. The aircraft bus may also refer to the expanse in which electromagnetic radiation and their corresponding electromagnetic waves are propagated. Moreover, the aircraft bus may be formed from a combination of mediums configured to transmit signals. In one embodiment, the aircraft bus includes a combination of conductive traces, conductive wires, connectors, and buses that cooperate to permit the transmission of electrical data signals to and from the various components of the engine control system 136. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

For example, an interconnectivity of components coupled via a network, may include a wide area network, such as the internet, a local area network (LAN), a mobile communications network, a public service telephone network (PSTN) and/or other network and may be configured to electronically connect components. The illustrative components that may be connected via the network include, but are not limited to, a ground system 120 in communication with the aircraft 130 (e.g., via a ground wireless communications link 122 and an aircraft wireless communications link 166), and/or a ground support equipment 170 via a wired or wireless system.

It should be understood that the aircraft 130 merely represents one illustrative embodiment that may be configured to implement embodiments or portions of embodiments of the devices, systems, and methods described herein. During operation, by way of non-limiting example, the control mechanism 160 may be utilized to operate one or more of the aircraft systems 144. Various sensors, including, but not limited to, the fan speed sensors 152, the temperature sensors 154, the pressure sensors 156 and/or the cross wind sensors 158 may output data relevant to various characteristics of the engine 140 and/or the other aircraft systems 144. The engine control system 136 may utilize inputs from the control mechanism 160, the fan speed sensors 152, the temperature sensors 154, the pressure sensors 156, the cross wind sensors 158, the various aircraft systems 144, one or more database, and/or information from airline control, flight operations, or the like to diagnose, detect, and/or predict faults that airline maintenance crew may be unaware of. Among other things, the engine control system 136 may analyze the data output by the various sensors (e.g., the fan speed sensors 152, the temperature sensors 154, the pressure sensors 156, the cross wind sensors 158, etc.), over a period of time to determine drifts, trends, steps, or spikes in the operation of the engines 140 and/or the various other aircraft systems 144. The engine control system 136 may also analyze the system data to determine historic pressures, historic temperatures, pressure differences between the plurality of engines 140 on the aircraft 130, temperature differences between the plurality of engines 140 on the aircraft 130, and/or the like, and to diagnose, detect, and/or predict faults in the engines 140 and/or the various other aircraft systems 144 based thereon. The aircraft wireless communications link 166 and the ground wireless communications link 122 may transmit data such that data and/or information pertaining to the fault may be transmitted off the aircraft 130.

While the embodiment of FIG. 1 specifically relates to components within an aircraft 130, the present disclosure is not limited to such. That is, the various components depicted with respect to the aircraft 130 may be incorporated within various other types of craft and may function in a similar manner to deliver and install new software and/or updated software to the engine control system 136 as described herein. For example, the various components described herein with respect to the aircraft 130 may be present in watercraft, spacecraft, and/or the like without departing from the scope of the present disclosure.

Furthermore, it should be appreciated that, although a particular aerial vehicle has been illustrated and described, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Still referring to FIG. 1, the ground system 120 is generally a transmission system located on the ground that is capable of transmitting and/or receiving signals to/from the aircraft 130. That is, the ground system 120 may include a ground wireless communications link 122 that is communicatively coupled to the aircraft wireless communications link 166 wirelessly to transmit and/or receive signals and/or data. In some embodiments, the ground system 120 may be an air traffic control (ATC) tower and/or one or more components or systems thereof. Accordingly, the ground wireless communications link 122 may be a VHF communication system, an ACARS unit, a CPDLC system, FANS, and/or the like. Using the ground system 120 and the ground wireless communications link 122, the various non-aircraft components depicted in the embodiment of FIG. 1 may be communicatively coupled to the aircraft 130, even in instances where the aircraft 130 is airborne and in flight, thereby allowing for on-demand transmission of software and/or software updates whenever such software and/or software updates may be needed. However, it should be understood that the embodiment depicted in FIG. 1 is merely illustrative. In other embodiments, the aircraft 130 may be communicatively coupled to the various other components of the aircraft system 100 when on the ground and physically coupled to one of the components of the aircraft system 100, such as, for example, the ground support equipment 170.

The ground support equipment (GSE) 170 is an external equipment used to support and test the engine control system 136 and/or other components of the aircraft system 100. The ground support equipment 170 is configured to provide software updates to the engine control system 136 and download data obtained by the engine control system 136 during a flight. As another non-limiting example, the GSE 170 may include production support equipment for restricted data monitoring, test support equipment for comprehensive data monitoring and changing adjustable parameters, and integration test rigs for system and software testing. In embodiments, the GSE 170 may be connected to the engine control system 136 via wired local area network, or Ethernet. The GSE 170 may communicate with the engine control system 136 according to Ethernet protocols. The GSE 170 may be a portable maintenance access terminal. The GSE 170 may test a ballistic mode of the aircraft by directly communicating with the ECU 200 of the engine control system 136, which is described in more detail herein.

Figure 2A:
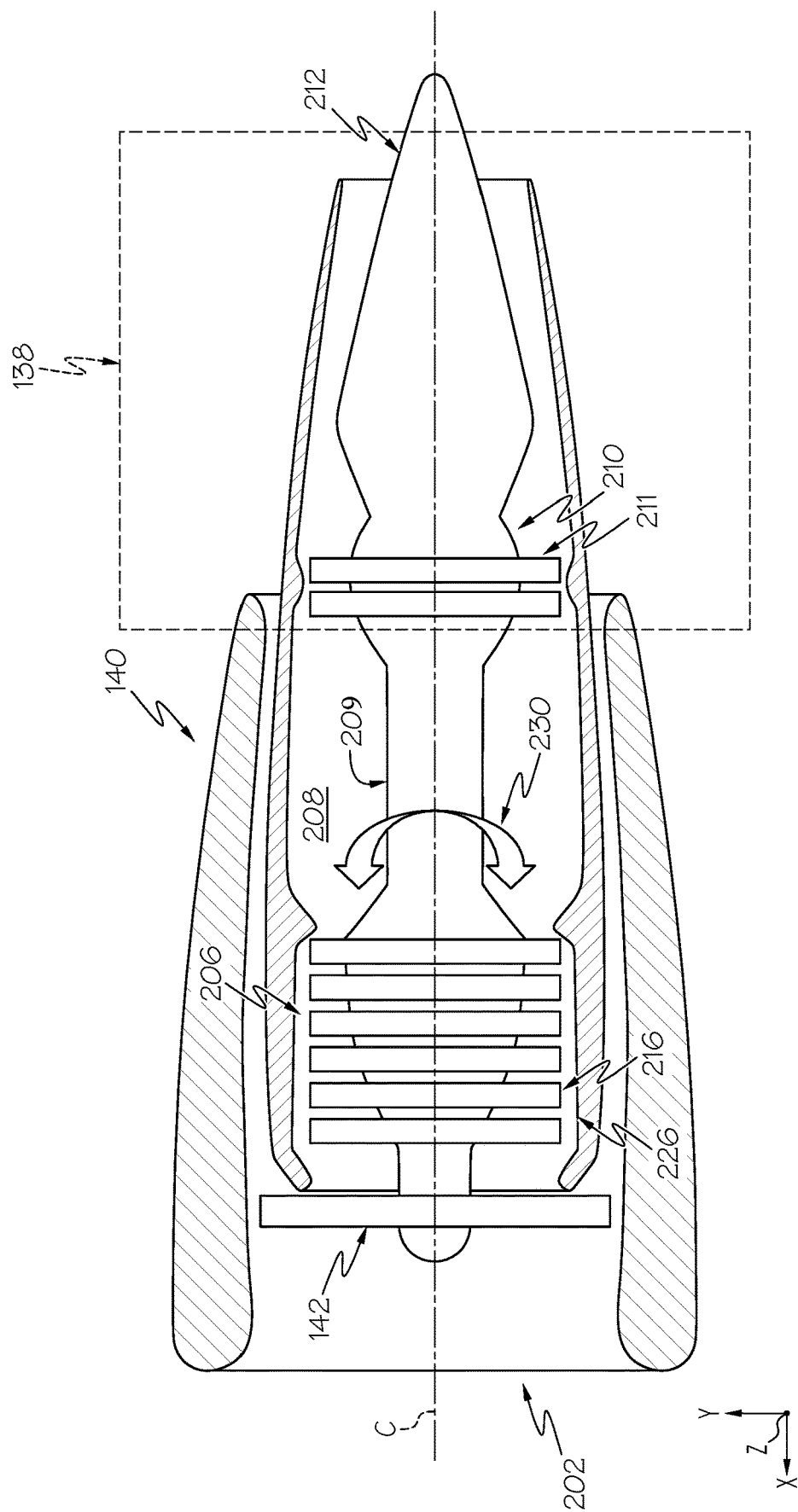
FIG. 2A depicts an illustrative example of a cross-section of an aircraft engine according to one or more embodiments shown and described herein.

Referring now to FIG. 2A, an illustrative cross-section of an aircraft engine 140 coupled to the wing 138 of an aircraft is depicted. Repetitive description of like elements employed in other embodiments described herein is omitted for sake of brevity. The aviation engine 140 includes an inlet 202, a fan 142, a compressor 206, a combustor 208, a turbine 210 and a nozzle 212.

During operation, a volume of air is drawn in through the inlet 202 of the fan section. The inlet 202 can continuously draw air into the aviation engine 140 through the inlet 202 and ensure smooth airflow into the aviation engine 140. As the volume of air passes through the fan 142, a first portion of the air may be directed or routed into the bypass airflow passage located outside the compressor 206. A second portion of the air is directed or routed into the compressor 206. The pressure of the second portion of air is then increased as it is routed from a LP section of the compressor 206 through a HP section of the compressor 206 and into the combustor 208. The fan 142 and the compressor 206 are made up of rotating blades and stationary vanes. The compressor 206 has a rotor that includes rotating blades have rotor blade tips 216 that are spaced apart by a predetermined cold clearance from the stator 226, which may include a casing, stationary vanes, shroud and/or the like. In a static, non-operational mode, the rotating components, such as the fan 142, the compressor 206, the combustor 208, and the turbine 210, and the stator may be positioned and centered along a shaft assembly 209 and the centerline "C." The pressure and temperature of the air increases as it moves through the compressor 206.

The combustor 208 can continuously add fuel to the compressed air and burn it. The combustion gases generated in the combustor 208 are routed from the combustor 208 along a hot gas path, through the turbine 210 where a portion of thermal and/or kinetic energy from the combustion gases is extracted via sequential stages of turbine stator vanes that are coupled to the outer casing 226 and turbine rotor blades 211 that are coupled to the shaft assembly 209, thus causing the shaft assembly 209 to rotate, thereby supporting operation of the compressor 206, the combustor 208, and the turbine 210. Some of this energy can also be used to drive the compressor 206. Cooling air or coolant from the compressor 206 can be used to cool the turbine blades of the turbine 210. The exhaust gases from the turbine 210 pass through the nozzle 212 to produce a high velocity jet. For example, the combustion gases are subsequently routed through the jet exhaust nozzle 212 of the turbine engine to provide propulsive thrust.

As described in more detail below, in operation, internal and external forces such as asymmetric thermal and mechanical loads including for example, but not limited to aero torque, gyro, thermal binding, inlet aerodynamics, crosswind, inertial loads, and the like, cause lateral relative movement between rotor blade tips 216 and stator flow paths (e.g., through the stationary vanes of the stator 226). The lateral movements, for example, as depicted by arrow 230, cause the clearances between the rotor blade tips 216 and the stator 226 to change. Accordingly, an aircraft engine 140 is designed with allowances, referred to herein as cold clearances, to compensate for the lateral movements that would otherwise result in undesired contact, i.e., rubs, between the rotor blade tips 216 and the stator 226 and other portions of the aircraft engine 140. These cold clearances may be reduced by implementing the systems and methods described herein. That is, the systems and methods described herein provide means for actively optimizing the clearances within an aircraft engine 140 by adjusting the hinge point of the whiffletree such that the clearance between the rotor and stator in the horizontal direction of the aircraft engine 140 are continuously adjusted to achieve better centering of the two.

Figure 2B:
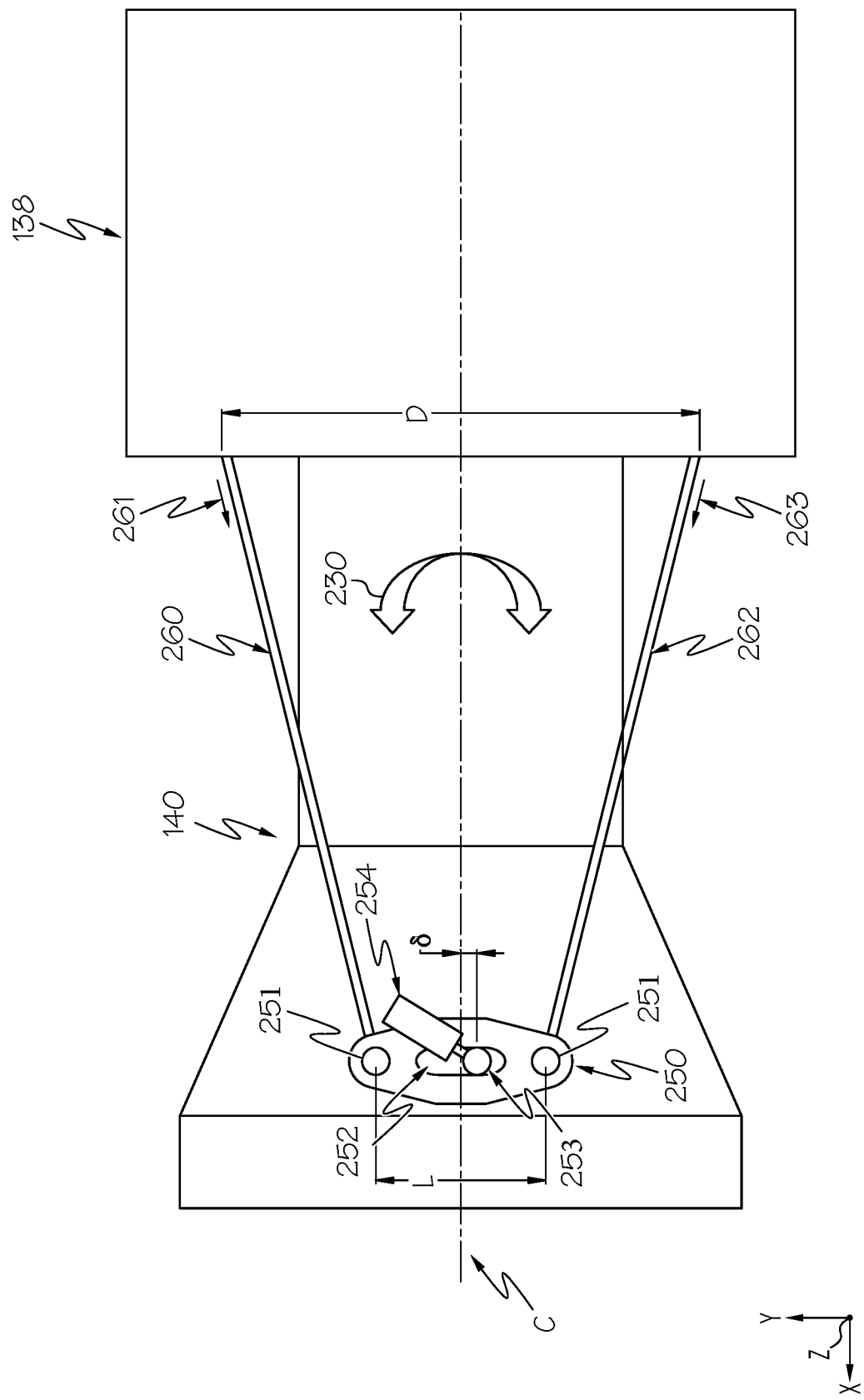
FIG. 2B depicts an illustrative example of an aircraft engine coupled to a wing of the aircraft including a thrust link whiffletree for adjusting a shaft centerline of the aircraft engine according to one or more embodiments shown and described herein.

By implementing an actively adjustable whiffletree and control logic for controlling the same as described herein, the cold clearances required by design may be reduced, thereby minimizing the clearances such that SFC is reduced and efficiency is improved. Turning to FIG. 2B, an illustrative example of an aircraft engine 140, illustrated in FIGS. 1 and 2A, coupled to a wing of the aircraft including a thrust link whiffletree for adjusting alignment of a shaft centerline of the aircraft engine 140 according to one or more embodiments is depicted. The embodiment depicted in FIG. 2B depicts an aircraft engine 140 mounted on a wing 138 of an aircraft. However, other embodiments may include an aircraft engine 140 mounted to the fuselage, tail, or nose of the aircraft. Regardless of the embodiment, the aircraft engine 140 may be mounted via one or more thrust links 260, 262 that are coupled to the aircraft at one end (e.g., the wing 138) and aperture 251 of the whiffletree 250 at the opposite end. The whiffletree 250 further includes a slot 252 configured to receive a pivot pin 253 controllably positioned within the slot 252 by an actuator 254. The actuator 254 may be coupled to the aircraft engine 140 such that extending and retracting the actuator 254 adjusts the position of the pivot pin 253 within the slot 252. Changing the position of the pivot pin 253 within the slot 252 adjusts the hinge point of the whiffletree 250. Furthermore, changing the hinge point of the whiffletree 250 changes the force distribution along each of the thrust links 260, 262, which in turn increases or decreases the amount of torque, M, (e.g., the direction of torque is depicted by arrow 230). The first thrust link 260 is attached to the wing at a predefined distance "D" from the second thrust link 262 attached to the same wing. The apertures 251 of the whiffletree have a predefined spacing from each other defining a length "L" where the opposite ends of the thrust links 260, 262 are attached. Furthermore, as the pivot pin 253 is moved, through the extension or retraction of the actuator 254, the pivot pin 253 is displaced a distance "δ" from the centerline "C." Accordingly, the force of thrust along the first thrust link 260 can be expressed through the following equation:

$$T1 = \text{Thrust} * \left[\left(\frac{1}{2}\right) + \left(\frac{\delta}{L}\right)\right]$$

and the force due to thrust along the second thrust link 262 can be similarly expressed through the following equation:

$$T2 = \text{Thrust} * \left[\left(\frac{1}{2}\right) - \left(\frac{\delta}{L}\right)\right].$$

The "Thrust" is the value of thrust generated by the aircraft engine 140. The torque (e.g., depicted by arrow 230) may be determined by the following equation:

$$M = \text{Thrust} * D * \left[\frac{\delta}{L}\right].$$

In some embodiments, when $$\left(\frac{\delta}{L}\right) = 10\%$$

a shift of the rotor (e.g., shaft 209) of about 3-5 mills, about 3 mils, about 4 mils, or about 5 mils may be generated. For example, the adjustment of the actuator to a determined actuator position may displace the pivot pin by about 2%, 3%, 4%, 5%, 6%, 7%, 8%, 9%, 10%, 11%, 12% 13%, 14%, or 15% from the centerline "C" with respect to the length "L" between apertures of the whiffletree. However, this is merely an example as greater or less shifts of the rotor may be accomplished by configuring the whiffletree aperture 251 spacing "L" to be smaller or larger, the distance "D" between the thrust links 260, 262 attached to the wing 138, and dynamically varying the pivot pin 253 displacement "δ" from the centerline "C."

Figure 3:
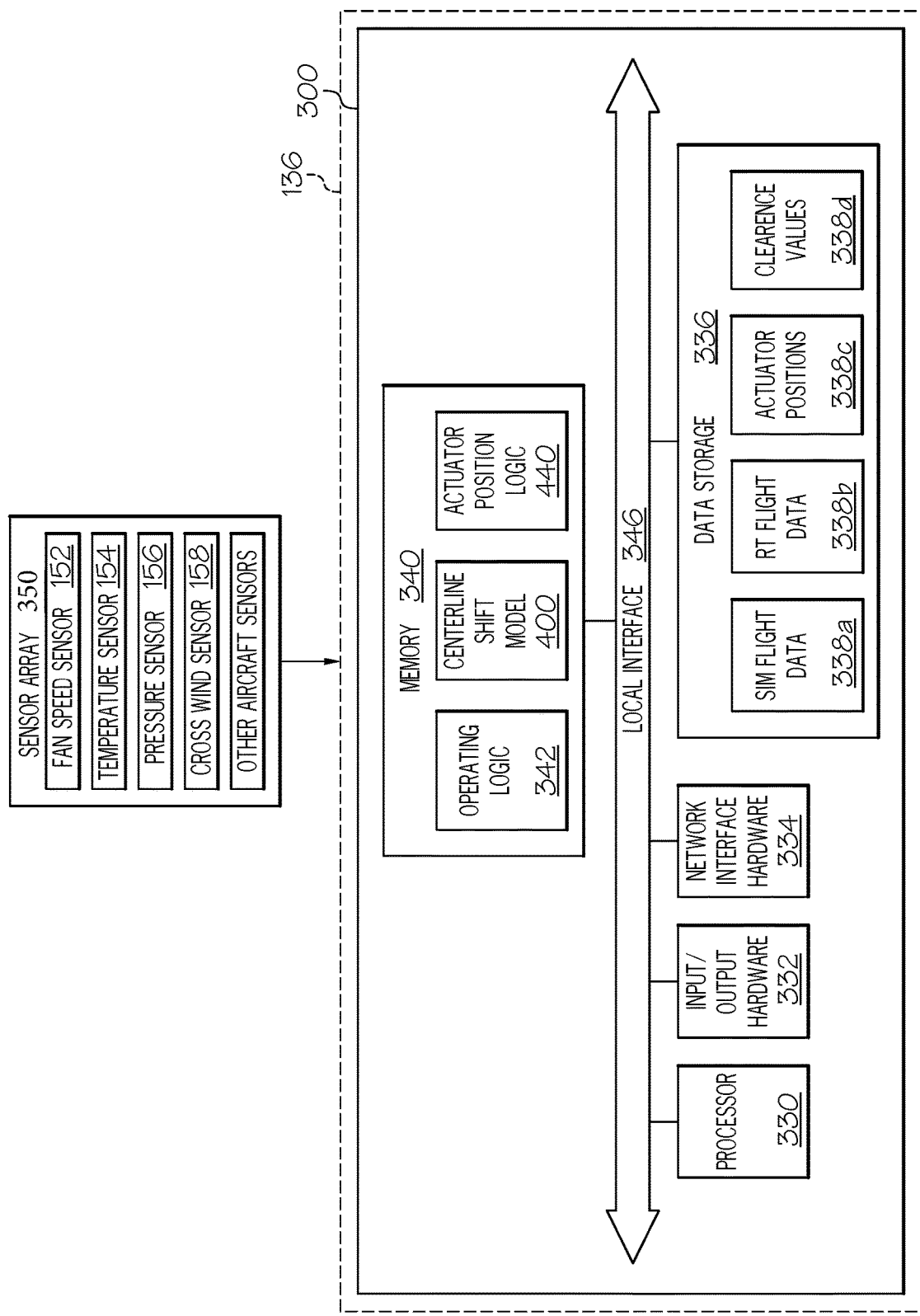
FIG. 3 schematically depicts a functional block diagram of an engine control system configured to include an electronic control unit for optimizing clearances within an aircraft engine according to one or more embodiments shown and described herein.
Figure 4:
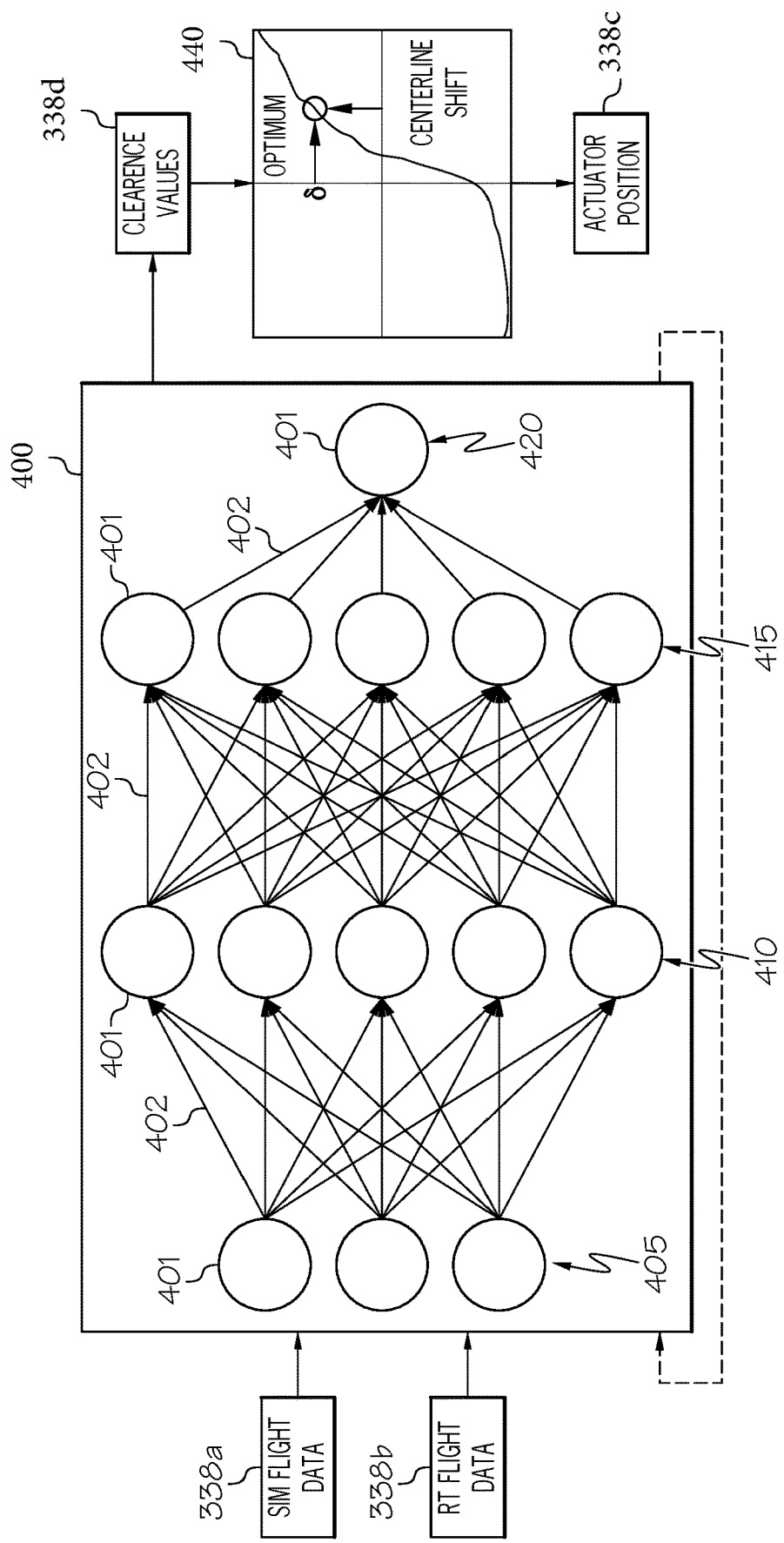
FIG. 4 an illustrative system diagram for controlling a pivot position of a variable thrust link whiffletree to optimize clearances within an aircraft engine according to one or more embodiments shown and described herein.

It should now be understood how the adjusting the pivot pin 253 changes the hinge point of the whiffletree 250 and effects the torque "M" and clearances within an aircraft engine 140. FIGS. 3-4 will now depict and describe how the amount of displacement "δ" of the pivot pin 253 from the centerline "C" is determined and controlled in order to dynamically adjust the clearances within the aircraft engine 140 to better center the rotor (e.g. shaft 209) and stator 226 with each other during operation of the aircraft engine, for example, during a flight.

Referring to FIG. 3, a functional block diagram of an engine control system 136 that includes an electronic control unit 300 for optimizing clearances within an aircraft engine 140 according to one or more embodiments is depicted. The engine control system 136 receives a variety of inputs including signals generated by one or more sensors 350 on the aircraft. The sensor inputs may include signals from the fan speed sensor 152 of the aircraft engines 140, temperature sensors 154 within the aircraft engine 140 as well as those configured to sample the external environment of the aircraft, pressure sensors 156, cross wind sensors 158, and other aircraft sensors. Some of the other aircraft sensors may include sensors capable of determining the angle of attack, engine thrust, windup torque, inertia, angular rate, angular velocity, or the like. Select ones of the sensor signals may feed into a centerline shift model 400, which is described in more detail with reference to FIG. 4, to predict real time clearances within the aircraft engine under the sensed operating conditions, which are ultimately used to determine an actuator position that corresponds to the amount of displacement "δ" of the pivot pin 253 from the centerline "C" that delivers shifts to the shaft 209 and/or the stator 226 that improves the clearances between the rotor blade tips 216 and the stator 226 for improved SFC and prevents rubbing therebetween.

The engine control system 136 includes an electronic control unit 300 that may utilize hardware, software, and/or firmware for optimizing clearances within an aircraft engine according to embodiments shown and described herein. While in some embodiments, the electronic control unit 300 may be configured as a general-purpose computer with the requisite hardware, software, and/or firmware, in some embodiments, the electronic control unit 300 may be configured as a special purpose computer designed specifically for performing the functionality described herein.

As also illustrated in FIG. 3, the electronic control unit 300 may include a processor 330, input/output hardware 332, network interface hardware 334, a data storage component 336, which stores a simulated flight data 338*a*, a real time flight data 338*b*, actuator positions 338*c*, and clearance values 338*d*, and a memory component 340. The memory component 340 may be machine readable memory (which may also be referred to as a non-transitory processor readable memory). The memory component 340 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, and logic for implementing a centerline shift model 400 and actuator position logic 440 (each of which may be embodied as a computer program, firmware, or hardware, as an example). A local interface 346 is also included in FIG. 3 and may be implemented as a bus or other interface to facilitate communication among the components of the electronic control unit 300.

The processor 330 may include any processing component(s) configured to receive and execute programming instructions (such as from the data storage component 336 and/or the memory component 340). The instructions may be in the form of a machine readable instruction set stored in the data storage component 336 and/or the memory component 340. The input/output hardware 332 may include a monitor, keyboard, mouse, printer, camera, microphone, speaker, and/or other device for receiving, sending, and/or presenting data. The network interface hardware 334 may include any wired or wireless networking hardware, such as a modem, LAN port, Wi-Fi card, WiMax card, mobile communications hardware, and/or other hardware for communicating with other networks and/or devices.

It should be understood that the data storage component 336 may reside local to and/or remote from the electronic control unit 300 and may be configured to store one or more pieces of data for access by the electronic control unit 300 and/or other components. As illustrated in FIG. 3, the data storage component 336 stores simulated flight data 338*a*. The simulated flight data 338*a* may include simulation data for an aircraft engine under various operating conditions and flight path parameters. The simulated flight data 338*a* may also include flight data, sensor readings, and measured clearance values from previous flights. The simulated flight data 338*a* may be used to train the centerline shift model 400, a machine learning model such as a neural network configured to predict clearances within the aircraft engine 140. The data storage component 336 may also include real time flight data 338*b* which may include data obtained through signals received from one or more sensors 350 or predefined flight parameters that may affect the operation of the aircraft engine 140. While in some embodiments the signals received from one or more sensors 350 may be fed directly into the centerline shift model 400, there may be embodiments where real time flight data is recorded for future use by the engine control system 136 or verification during a training process of the centerline shift model 400.

The data storage component 336 may also include actuator positions 338*c*. The actuator positions 338*c* may be a set of preset values that define the operational range of the actuator 254 based on the implementation of the actuator 254, whiffletree 250, and aircraft engine 140. In other words, these may be calibration values defining the relationship between the extension and retraction portion of the actuator arm with respect to the position of a pivot pin 253 within the slot 252 of a whiffletree 250. For example, an extension of the actuator arm to a distance "X" may correspond to a displacement position "δ" of the pivot pin 253 within the slot 252 of the whiffletree away from the centerline "C." That is, the position of the pivot pin 253 within the slot 252 of the whiffletree 250 defines the hinge point of the whiffletree 250.

The data storage component 336 may also include clearance values 338*d*. The clearance values 338*d* include predicted values generated by the centerline shift model 400 during operation. The clearance values 338*d* may be defined as the amount and direction of the lateral movement of the shaft 209 with respect to the centerline "C" of the aircraft engine. The clearance values 338*d* that are predicted by the centerline shift model 400 may be utilized by the actuator position logic 440. The actuator position logic 440 based on a predicted current clearance value 338*d* of the shaft 209 of the aircraft engine determines the position the pivot pin 253 should be located to adjust the shaft 209 to compensate for (i.e., overcome or counteract) the torque "M" that otherwise would cause the shaft 209 to shift away from the centerline "C" by a greater than acceptable degree. In other words, if operating conditions of an aircraft engine 140 would cause the clearances within an engine to decrease below an acceptable predetermined value (e.g., less than 8 mils), then the actuator 254 may cause the pivot pin 253 to be repositioned such that lateral movement of the shaft 209 may maintain clearances within an acceptable range for the aircraft engine 140 (e.g., greater or equal to 8 mils).

Included in the memory component 340 are the operating logic 342, and logic for implementing the centerline shift model 400 and actuator position logic 440. The operating logic 342 may include an operating system and/or other software for managing components of the electronic control unit 300. The centerline shift model 400 will be described in more detail with reference to FIG. 4, below. The actuator position logic 440, as described above, includes logic for determining the position of the pivot pin 253 based on based on a predicted current clearance value 338*d* that accounts for (i.e., overcomes or counteracts) the torque "M" that otherwise would cause the shaft 209 to shift away from the centerline "C" by a greater than acceptable degree.

The system implements a machine learning model that is trained to predict one or more clearance values within the aircraft engine based on the received flight data. As used herein, the term "machine learning model" refers to one or more mathematical models configured to find patterns in data and apply the determined pattern to new data sets to form a prediction. Different approaches, also referred to as categories of machine learning, are implemented depending on the nature of the problem to be solved and the type and volume of data. Categories of machine learning models include, for example, supervised learning, unsupervised learning, reinforcement learning, deep learning or a combination thereof.

Supervised learning utilize a target or outcome variable such as a dependent variable which is to be predicted from a given set of predictors also referred to as an independent variable. These sets of variables are used to generate a function that maps labeled inputs to desired outputs. The training process is iterative and continues until the model achieves a desired level of accuracy on the training data. Machine learning models categorized as supervised learning algorithms and models include, for example, a neural network, regression, decision tree, random forest, k-nearest neighbors (kNN), logistic regression, or the like.

Unsupervised learning, unlike supervised learning, is a learning algorithm that does not use labeled data, thereby leaving it to determine structure from the inputs. In other words, the goal of unsupervised learning is to find hidden patterns in data through methods such as clustering. Some examples of unsupervised learning include Apriori algorithms or K-means. Reinforcement learning refers to machine learning models that are trained to make specific decisions. The machine learning model is exposed to an environment where it trains itself continually using trial and error. Such a model learns from past experience and tries to capture the best possible knowledge to make accurate business decisions. An example of reinforcement learning includes Markov decision process.

Deep learning is a method of machine learning that incorporates neural networks in successive layers to learn from data in an iterative manner. Deep learning can learn patterns from unstructured data. Deep learning algorithms perform a task repeatedly and gradually improve the outcome through deep layers that enable progressive learning. Deep learning can include supervised learning or unsupervised learning aspects. Some deep learning machine learning models are, for example, artificial neural networks (ANNs), convolutional neural networks (CNNs), recurrent neural networks (RNNs), long short-term memory/gated recurrent unit (GRU), self-organizing map (SOM), autoencoders (AE), and restricted Boltzman machine (RBM).

A machine learning model is understood as meaning any variety of mathematical model having at least one non-linear operation (e.g., a non-linear activation layer in the case of a neural network). A machine learning model is trained or optimized via minimization of one or more loss functions (e.g., minimization of cross entropy loss or negative log-likelihood) that are separate from the model itself. A training or optimization process seeks to optimize the model to reproduce a known outcome (low bias) as well as enabling the model to make accurate predictions from unseen experiences (low variance). The model's output may be any variety of things relevant to the task such as a predicted value, a classification, a sequence, or the like. In the present embodiments, the output may be clearance values and/or confidence levels associated with the predicted clearance values.

Referring now to FIG. 4, an illustrative system diagram for controlling a pivot position of a variable thrust link whiffletree to optimize clearances within an aircraft engine according to one or more embodiments is depicted. The illustrative system depicted in FIG. 4, shows an embodiment where the machine learning model implemented is a neural network model. However, it is understood that utilization of a neural network model is merely one example of a machine learning model trained to predict one or more clearance values within the aircraft engine based on the received flight data. The system includes implementing a neural network model referred to herein as the centerline shift model 400 to predict clearance values 338d within the aircraft engine under current operating conditions, for example, real time flight data 338b which includes signals form the one or more sensors 350 of the aircraft. The predicted clearance values 338d that would result under the current operating conditions are utilized by the actuator position logic 440 to determine a pivot pin 253 position that would offset all or part of the predicted clearance values 338d (i.e., the shaft shift) that results in a less than optimum alignment between the rotor blade tips 216 and the stator 226. In other words, the actuator position logic 440 determines a pivot pin 253 position that optimizes the alignment of the rotor blade tips 216 and the stator 226, such that they are better centering in the horizontal direction (Y-axis, FIGS. 2A and 2B).

In training mode, simulated flight data 338a is used to provide operating conditions and simulated sensor readings to the centerline shift model 400. The centerline shift model 400 may be trained using a supervised or unsupervised method, optionally with a feedback loop to tune the weights of the nodes of the centerline shift model 400 to achieve accurate predictions of the clearance values 338d under real operational conditions.

The centerline shift model 400 (e.g., a neural network) may include one or more layers 405, 410, 415, 420, having one or more nodes 401, connected by node connections 402. The one or more layers 405, 410, 415, 420 may include an input layer 405, one or more hidden layers 410, 415, and an output layer 420. The centerline shift model 400 may be a deep neural network, a convolutional neural network, or other type of neural network. The centerline shift model 400 may include one or more convolution layers and one or more fully connected layers. The input layer 405 represents the raw information that is fed into the neural network 400. For example, real time flight data 338b including signals from the one or more sensors 350 may be input into the centerline shift model 400 at the input layer 405.

The real time flight data 338b processes the raw information received at the input layer 405 through nodes 401 and node connections 402. The real time flight data 338b can be highly non-linear and interdependent on flight maneuver conditions. As such, machine learning models can systematically ingest the non-linear data and determine patterns that may be used to predict one or more clearance values within the aircraft engine based on the received flight data 338b. For example, the one or more hidden layers 410, 415, depending on the inputs from the input layer 405 and the weights on the node connections 402, carry out computational activities. In other words, the hidden layers 410, 415 perform computations and transfer information from the input layer 405 to the output layer 420 through their associated nodes 401 and node connections 402.

In general, when the centerline shift model 400 is learning, the centerline shift model 400 is identifying and determining patterns within the raw information received at the input layer 405. In response, one or more parameters, for example, weights associated to node connections 402 between nodes 401, may be adjusted through a process known as backpropagation. It should be understood that there are various processes in which learning may occur, however, two general learning processes include associative mapping and regularity detection. Associative mapping refers to a learning process where a centerline shift model 400 learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks learn through forward and backward propagation to update the weights and biases to fit the training data. Information is stored in a weight matrix W of a neural network. Learning is accomplished by the optimization of the weights. Depending on the way learning is performed, two major categories of neural networks can be distinguished: 1) fixed networks in which the weights cannot be changed (i.e., dW/dt=0), and 2) adaptive networks which are able to change their weights (i.e., dW/dt not=0). In fixed networks, the weights are fixed a priori according to the problem to solve.

In order to train a centerline shift model 400 to perform a task, adjustments to the weights are made in such a way that the error between the desired output and the actual output is reduced. This process may require that the centerline shift model 400 computes the error derivative of the weights (EW). In other words, it must calculate how the error changes as each weight is increased or decreased slightly. A backpropagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the centerline shift model 400, hence "backpropagation". Once the EA has been computed for a unit, it is straight forward to compute the EW for each incoming connection of the unit. The EW is the product of the EA and the activity through the incoming connection. It should be understood that this is only one method in which a centerline shift model 400 is trained to perform a task.

Still referring to FIG. 4, the centerline shift model 400 may include one or more hidden layers 410, 415 that feed into one or more nodes 401 of an output layer 420. There may be one or more output layers 420 depending on the particular output the centerline shift model 400 is configured to generate. In the present embodiments, the outputs may include predicted clearance values 338d relating to the amount of horizontal or lateral movement of components within the aircraft engine 140 with respect to a centerline "C."

The predicted clearance values 338d, as described above, are then utilized by the actuator position logic 440 to determine an actuator position 338c that optimizes the hinge position of the whiffletree 250 to deliver optimized clearances of the stator and rotor.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Figure 5:
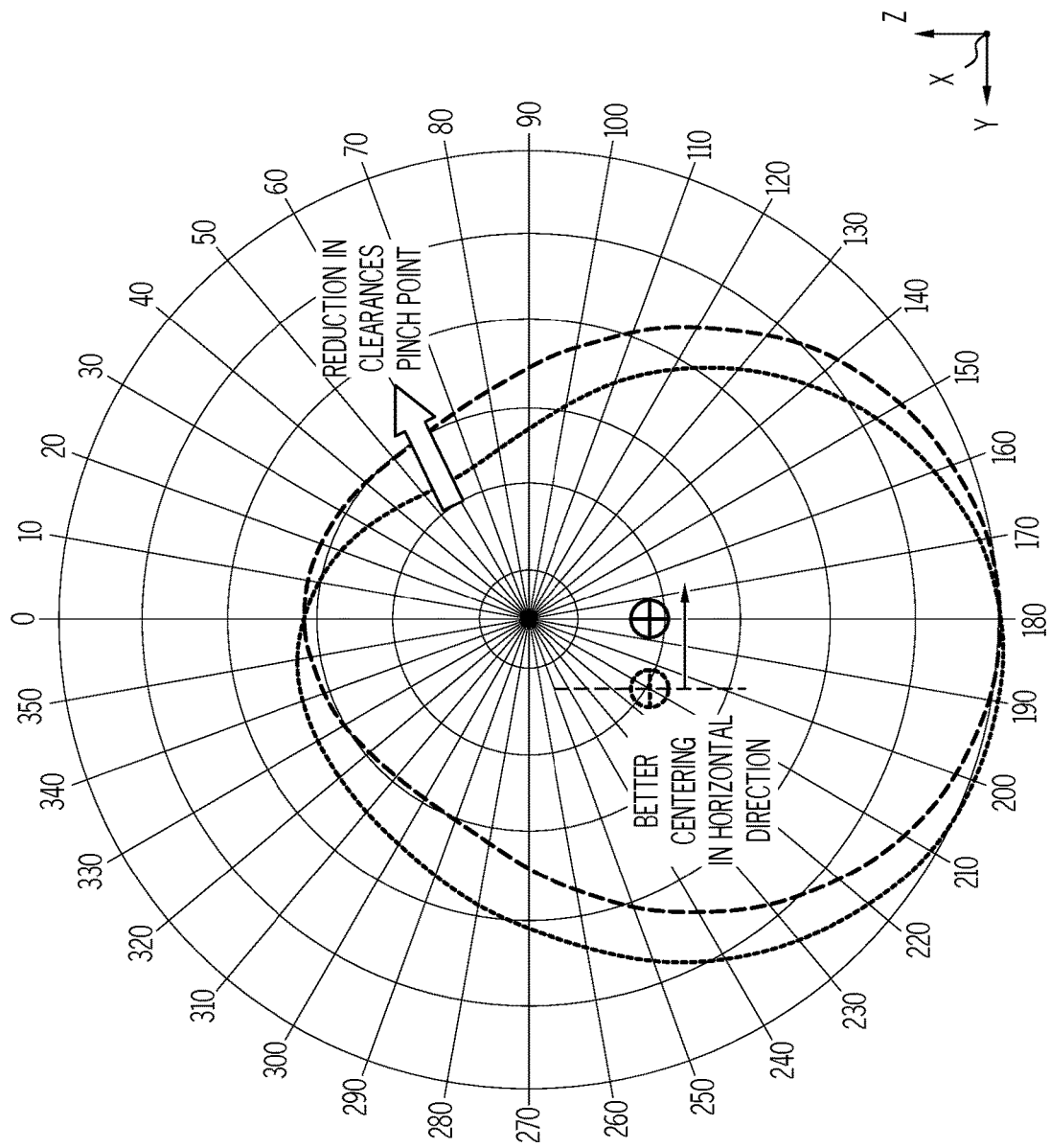
FIG. 5 depicts a chart illustrating the reduction in clearances by optimizing the centering of the stator and rotor in the horizontal (lateral) direction according to one or more embodiments shown and described herein.

FIG. 5 depicts a chart illustrating the reduction in clearances by optimizing the centering of the stator and rotor in the horizontal (lateral) direction according to one or more embodiments described herein. The chart depicts the predicted clearance values using short-dashed lines. The optimum clearances are depicted using long-dashed lines. In operation, the centerline shift model 400 would predict the predicted clearance values and the actuator position logic 440 would determine an adjustment and new position for the pivot pin 253 within the slot 252 of the whiffletree 250 to move adjust the predicted real time clearance values to better center in at least the horizontal direction with the optimum clearances.

Figure 6:
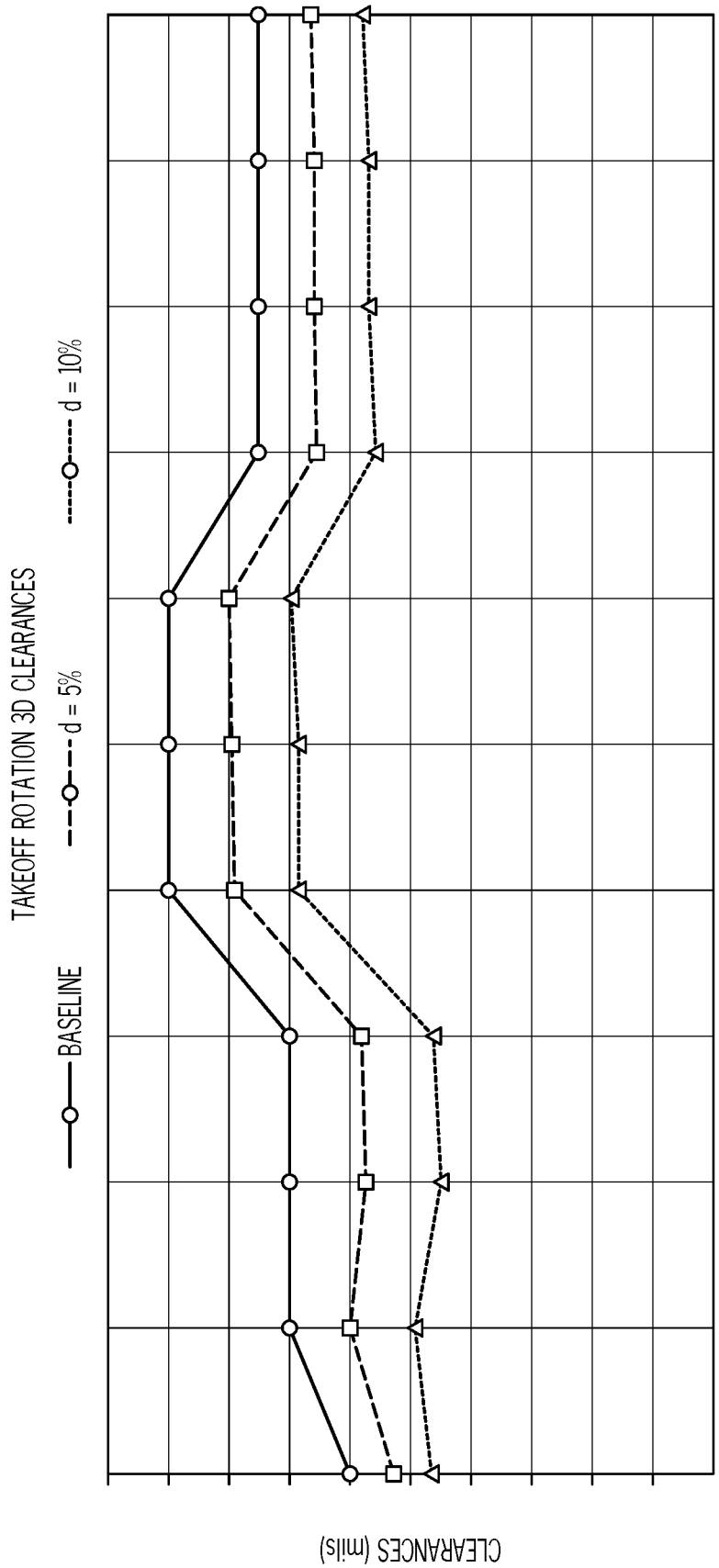
FIG. 6 depicts a chart illustrating reductions in clearances for multiple stages of a high pressure compressor of an aircraft engine according to one or more embodiments shown and described herein.

Referring now to FIG. 6, a chart illustrating reductions in clearances for multiple stages of a high pressure compressor of an aircraft engine according to one or more embodiments is depicted. It is understood that while the present disclosure describes the system and method with reference to optimizing the alignment and better centering the clearances of within the compressor 206 portion of the aircraft engine 140, the same systems and methods may be applied to optimizing clearances within the fan 142, combustor 208, turbine 210, or other sections of the aircraft engine 140. Furthermore, it is known that a compressor 206 can include multiple stages and each stage includes blades having rotor blade tips 216 with clearances to a stator 226 (e.g., stationary vanes). The chart depicted in FIG. 6 depicts the resulting clearances per stage when implementing dynamic control of the whiffletree 250 within an aircraft engine 140 as depicted and described herein. That is, through the implementation of dynamic control of the whiffletree 250 cold clearances may be reduced from a "baseline" value to improve SFC and engine efficiency because the engine runs with less open clearances.

It should now be understood that the present disclosure is directed to systems and methods for adjusting blade tip clearance targets by controlling the hinge position of a whiffletree link. In one embodiment, a whiffletree having at least one aperture couples to one or more thrust links that may be further coupled to an airplane wing and/or fuselage. The whiffletree also includes a slot defining a hinge point. An actuator comprising a pivot pin is slidably coupled within the slot of the whiffletree. Motion produced by the actuator adjusts the position of the pivot pin within the slot of the whiffletree thereby changing the hinge point of the whiffletree. One or more sensors configured to capture real time flight data generate and send signals to an electronic control unit communicatively coupled to the actuator. The electronic control unit is configured to receive flight data from the one or more sensors, implement a machine learning model trained to predict one or more clearance values within the aircraft engine based on the received flight data, predict, with the machine learning model, the one or more clearance values within the aircraft engine based on the received flight data, determine an actuator position based on the one or more clearance values; and cause the actuator to adjust to the determined actuator position.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

Further aspects of the invention are provided by the subject matter of the following clauses:

A system for optimizing clearances within an aircraft engine includes an adjustable coupling configured to couple a thrust link to the aircraft engine, an actuator coupled to the adjustable coupling, where motion produced by the actuator adjusts a hinge point of the adjustable coupling, one or more sensors configured to capture real time flight data, and an electronic control unit communicatively coupled to the actuator and the one or more sensors. The electronic control unit is configured to receive flight data from the one or more sensors, implement a machine learning model trained to predict one or more clearance values within the aircraft engine based on the received flight data, predict, with the machine learning model, the one or more clearance values within the aircraft engine based on the received flight data, determine an actuator position based on the one or more clearance values, and cause the actuator to adjust to the determined actuator position.

The system of any preceding clause, wherein the one or more clearance values within the aircraft engine define a lateral movement of a shaft with respect to a centerline of the aircraft engine.

The system of any preceding clause, wherein the electronic control unit is configured to generate and transmit a control signal to the actuator to adjust the actuator to the determined actuator position.

The system of any preceding clause, wherein the adjustable coupling comprises at least one aperture for coupling to the thrust link and a slot defining a hinge point of the adjustable coupling, the adjustment of the actuator to the determined actuator position displaces a pivot pin slidably coupled within the slot by about 10% from a centerline "C" with respect to a length "L" between apertures of the adjustable coupling.

The system of any preceding clause, wherein the adjustment of the actuator to the determined actuator position displaces the pivot pin by about 5% from a centerline "C" with respect to the length "L" between apertures of the adjustable coupling.

The system of any preceding clause, wherein the one or more sensors includes at least one of a fan speed sensor, a temperature sensor, a pressure sensor, or a cross wind sensor.

The system of any preceding clause, wherein the adjustment of the actuator to the determined actuator position improves the one or more clearance values by 3 to 5 mils.

A method for optimizing clearances within an aircraft engine includes receiving, with an electronic control unit, flight data from one or more sensors, implementing, with the electronic control unit, a machine learning model trained to predict one or more clearance values within the aircraft engine based on the flight data, predicting, with the machine learning model, the one or more clearance values within the aircraft engine based on the flight data, determining, with the electronic control unit, an actuator position based on the one or more clearance values, and causing, with the electronic control unit, an actuator to adjust to the determined actuator position.

The method of any preceding clause, wherein the actuator adjusts a position of a pivot pin within a slot of an adjustable coupling thereby changing a hinge point of the adjustable coupling.

The method of any preceding clause, further comprising, generating, with the electronic control unit, a control signal for adjusting the actuator to the determined actuator position.

The method of any preceding clause, wherein adjusting the actuator to the determined actuator position displaces a pivot pin slidably coupled within the slot by about 10% from a centerline "C" with respect to a length "L" between apertures of an adjustable coupling.

The method of any preceding clause, wherein adjusting the actuator to the determined actuator position displaces the pivot pin by about 5% from a centerline "C" with respect to a length "L" between apertures of the adjustable coupling.

The method of any preceding clause, wherein the one or more sensors includes at least one of a fan speed sensor, a temperature sensor, a pressure sensor, or a cross wind sensor.

The method of any preceding clause, wherein the adjusting the actuator to the determined actuator position improves the one or more clearance values by 3 to 5 mils.

An aircraft includes an aircraft engine coupled to a wing with at least one thrust link and an adjustable coupling, where the adjustable coupling comprising at least one aperture for coupling to the at least one thrust link and a slot defining a hinge point of the adjustable coupling, an actuator comprising a pivot pin slidably coupled within the slot, where motion produced by the actuator adjusts a position of the pivot pin within the slot thereby changing the hinge point of the adjustable coupling, one or more sensors configured to capture real time flight data, and an electronic control unit communicatively coupled to the actuator and the one or more sensors. The electronic control unit is configured to receive flight data from the one or more sensors, implement a machine learning model trained to predict one or more clearance values within the aircraft engine based on the received flight data, predict, with the machine learning model, the one or more clearance values within the aircraft engine based on the received flight data, determine an actuator position based on the one or more clearance values, and cause the actuator to adjust to the determined actuator position.

The aircraft of any preceding clause, wherein the electronic control unit is configured to generate and transmit a control signal to the actuator to adjust the actuator to the determined actuator position.

The aircraft of any preceding clause, wherein the adjustment of the actuator to the determined actuator position displaces the pivot pin by about 10% from a centerline "C" with respect to a length "L" between apertures of the adjustable coupling.

The aircraft of any preceding clause, wherein the adjustment of the actuator to the determined actuator position displaces the pivot pin by about 5% from a centerline "C" with respect to a length "L" between apertures of the adjustable coupling.

The aircraft of any preceding clause, wherein the one or more sensors includes at least one of a fan speed sensor, a temperature sensor, a pressure sensor, or a cross wind sensor.

The aircraft of any preceding clause, wherein the adjustment of the actuator to the determined actuator position improves the one or more clearance values by 3 to 5 mils.

What is claimed is:

1. A system for optimizing clearances within an aircraft engine comprising:
    an adjustable coupling configured to couple a thrust link to the aircraft engine, wherein the adjustable coupling includes apertures for coupling to the thrust link and a slot defining a hinge point of the adjustable coupling;
    an actuator coupled to the adjustable coupling, wherein motion produced by the actuator adjusts the hinge point of the adjustable coupling;
    one or more sensors configured to capture real time flight data; and an electronic control unit communicatively coupled to the actuator and the one or more sensors, wherein the electronic control unit is configured to:
receive flight data from the one or more sensors;
implement a machine learning model trained to predict one or more clearance values within the aircraft engine based on the received flight data;
predict, with the machine learning model, the one or more clearance values within the aircraft engine based on the received flight data;
determine an actuator position based on the one or more clearance values; and
cause the actuator to adjust to the determined actuator position, wherein the adjustment of the actuator to the determined actuator position displaces a pivot pin slidably coupled within the slot by a distance from a centerline "C" with respect to a length "L" between the apertures of the adjustable coupling.

2. The system of claim 1, wherein the one or more clearance values within the aircraft engine define a lateral movement of a shaft with respect to a centerline of the aircraft engine.

3. The system of claim 1, wherein the electronic control unit is configured to generate and transmit a control signal to the actuator to adjust the actuator to the determined actuator position.

4. The system of claim 1, wherein the adjustment of the actuator to the determined actuator position displaces the pivot pin by 10% from the centerline "C" with respect to the length "L".

5. The system of claim 4, wherein the adjustment of the actuator to the determined actuator position displaces the pivot pin by 5% from the centerline "C" with respect to the length "L".

6. The system of claim 1, wherein the one or more sensors includes at least one of a fan speed sensor, a temperature sensor, a pressure sensor, or a cross wind sensor.

7. The system of claim 1, wherein the adjustment of the actuator to the determined actuator position improves the one or more clearance values by 3 to 5 mils.

8. An aircraft comprising:
an aircraft engine coupled to a wing with at least one thrust link and an adjustable coupling, wherein the adjustable coupling includes apertures for coupling to the at least one thrust link and a slot defining a hinge point of the adjustable coupling;
an actuator including a pivot pin slidably coupled within the slot, wherein motion produced by the actuator adjusts a position of the pivot pin within the slot, which changes the hinge point of the adjustable coupling;
one or more sensors configured to capture real time flight data; and
an electronic control unit communicatively coupled to the actuator and the one or more sensors, wherein the electronic control unit is configured to:
receive flight data from the one or more sensors;
implement a machine learning model trained to predict one or more clearance values within the aircraft engine based on the received flight data;
predict, with the machine learning model, the one or more clearance values within the aircraft engine based on the received flight data;
determine an actuator position based on the one or more clearance values; and
cause the actuator to adjust to the determined actuator position, wherein the adjustment of the actuator to the determined actuator position displaces the pivot pin slidably coupled within the slot by a distance from a centerline "C" with respect to a length "L" between the apertures of the adjustable coupling.

9. The aircraft of claim 8, wherein the electronic control unit is configured to generate and transmit a control signal to the actuator to adjust the actuator to the determined actuator position.

10. The aircraft of claim 8, wherein the adjustment of the actuator to the determined actuator position displaces the pivot pin by about 10% from the centerline "C" with respect to the length "L" between apertures of the adjustable coupling.

11. The aircraft of claim 8, wherein the adjustment of the actuator to the determined actuator position displaces the pivot pin by about 5% from the centerline "C" with respect to the length "L" between apertures of the adjustable coupling.

12. The aircraft of claim 8, wherein the one or more sensors includes at least one of a fan speed sensor, a temperature sensor, a pressure sensor, or a cross wind sensor.

13. The aircraft of claim 8, wherein the adjustment of the actuator to the determined actuator position improves the one or more clearance values by 3 to 5 mils.

14. A method for optimizing clearances within an aircraft engine comprising:
receiving, with an electronic control unit, flight data from one or more sensors, the electronic control unit communicatively coupled to the one or more sensors and to an actuator;
implementing, with the electronic control unit, a machine learning model trained to predict one or more clearance values within the aircraft engine based on the flight data, the aircraft engine coupled to a wing with at least one thrust link and an adjustable coupling, wherein the adjustable coupling includes apertures for coupling to at least one thrust link and a slot defining a hinge point of the adjustable coupling;
predicting, with the machine learning model, the one or more clearance values within the aircraft engine based on the flight data;
determining, with the electronic control unit, an actuator position based on the one or more clearance values; and
causing, with the electronic control unit, an actuator to adjust to the determined actuator position, the actuator including a pivot pin slidably coupled within a slot, wherein motion produced by the actuator adjusts a position of the pivot pin within the slot, which changes the hinge point of the adjustable coupling, and wherein the adjustment of the actuator to the determined actuator position displaces the pivot pin slidably coupled within the slot by a distance from a centerline "C" with respect to a length "L" between the apertures of the adjustable coupling.

15. The method of claim 14, further including, generating, with the electronic control unit, a control signal for adjusting the actuator to the determined actuator position.

16. The method of claim 14, wherein adjusting the actuator to the determined actuator position displaces the pivot pin slidably coupled within the slot by about 10% from the centerline "C" with respect to the length "L" between apertures of the adjustable coupling.

17. The method of claim 16, wherein adjusting the actuator to the determined actuator position displaces the pivot pin by about 5% from the centerline "C" with respect to the length "L" between apertures of the adjustable coupling.

18. The method of claim 14, wherein the one or more sensors includes at least one of a fan speed sensor, a temperature sensor, a pressure sensor, or a cross wind sensor.

19. The method of claim 14, wherein the adjusting the actuator to the determined actuator position improves the one or more clearance values by 3 to 5 mils.

\* \* \* \* \*